(12) United States Patent
Flamm

(10) Patent No.: US 6,932,383 B2
(45) Date of Patent: Aug. 23, 2005

(54) GAS GENERATOR AND RESTRAINT SYSTEM FOR A VEHICLE

(76) Inventor: Frieder Flamm, Habichtweg 1, Stolberg (DE), 52223

( * ) Notice: Subject to any disclaimer, the term of this patent is extended or adjusted under 35 U.S.C. 154(b) by 117 days.

(21) Appl. No.: 10/344,497

(22) PCT Filed: Jul. 19, 2001

(86) PCT No.: PCT/EP01/08346

§ 371 (c)(1), (2), (4) Date: Feb. 11, 2003

(87) PCT Pub. No.: WO02/14118

PCT Pub. Date: Feb. 21, 2002

(65) Prior Publication Data

US 2003/0178830 A1 Sep. 25, 2003

(51) Int. Cl.[7] .............................................. B60R 21/28
(52) U.S. Cl. ........................................ 280/737; 280/741
(58) Field of Search ................................ 280/741, 736, 280/737; 222/146.1

(56) References Cited

U.S. PATENT DOCUMENTS

| 3,994,506 A | * | 11/1976 | Weman ...................... 280/738 |
| 4,026,580 A | | 5/1977 | Wulf et al. .................. 280/736 |
| 4,126,325 A | * | 11/1978 | Weman ...................... 280/738 |
| 5,433,476 A | | 7/1995 | Materna ...................... 280/736 |
| 5,447,597 A | * | 9/1995 | Zimmermann et al. ..... 156/584 |
| 5,527,066 A | | 6/1996 | Svensson .................... 280/737 |
| 6,076,468 A | * | 6/2000 | DiGiacomo et al. ........ 280/741 |
| 6,149,191 A | * | 11/2000 | Rink .......................... 280/736 |
| 6,155,600 A | * | 12/2000 | Reynolds et al. ........... 280/741 |

FOREIGN PATENT DOCUMENTS

| DE | 43 09 241 | 9/1994 | |
| DE | 44 19 313 | 12/1995 | ............ C06D/5/02 |
| DE | 196 12 581 | 10/1997 | ............ B60R/21/26 |
| GB | 1 333 959 | 10/1973 | ............ B60R/21/08 |
| JP | 7257311 | 10/1995 | |

* cited by examiner

*Primary Examiner*—Paul N. Dickson
*Assistant Examiner*—Joselynn Y. Sliteris
(74) *Attorney, Agent, or Firm*—Cohen, Pontani, Lieberman & Pavane

(57) ABSTRACT

A gas generator for deploying and inflating an impact cushion of a passenger restraint system, with a gas generator housing, which has at least one seal, for holding a propellant for generating the required quantity of inflating gas for the impact cushion. The required amount of inflating gas is generated exclusively with water that vaporizes virtually instantaneously, when an emergency occurs, i.e., when the restraint system is activated. When the restraint system is activated, the required vaporization is brought about by depressurization of the heated water, which is contained in a closed pressure chamber.

17 Claims, 8 Drawing Sheets

GAS GENERATOR AND RESTRAINT SYSTEM FOR A VEHICLE

PRIORITY CLAIM

This is a U.S. national stage of application No. PCT/EP01/08346, filed on 19 Jul. 2001. Priority is claimed on that application and on the following applications: Country: Germany, Application No.: 100 40 000.0, Filed: 11 Aug. 2000; and Country: Germany, Application No.: 100 56 228.0, Filed: 13 Nov. 2000.

BACKGROUND OF THE INVENTION

1. Field of the Invention

The invention concerns a gas generator for deploying and inflating at least one impact cushion of a passenger restraint system, with a gas generator housing, which has at least one seal, for holding a propellant for generating a quantity of inflating gas for each impact cushion. The invention also concerns a passenger restraint system for vehicles and a method of inflating and deploying at least one impact cushion of a passenger restraint system of this type.

2. Description of the Related Art

Passenger restraint systems are used in vehicles of all types, especially land vehicles, boats, and aircraft.

State-of-the-art restraint systems of this type, which are also known as air bags or airbag systems, consist of a device for generating the required quantity of inflating gas (gas generator), an impact cushion, which usually consists of a textile material, and an activating and monitoring unit that controls and/or regulates the gas generator. In the event of a vehicle collision, the impact cushion prevents passengers from striking interior parts of the vehicle, such as the steering wheel or the side panels. In motor vehicles, the activating and monitoring unit is usually housed in the central tunnel near the gear-shifting gate.

Pyrotechnic gas generators are distinguished from so-called hybrid gas generators. In pyrotechnic gas generators, the gas is generated by a pyrotechnic propellant, which is ignited in an emergency. The nitrogen gas formed by the consumption of the propellant enters the impact cushion through holes in the gas generator housing and deploys and inflates the impact cushion in about 30 ms. The propellant charge is ignited by an ignition unit (AZE) which is ignited by an electrical pulse generated by the activating and monitoring unit. The pyrotechnic propellant is composed of sodium azide/calcium nitrate/sand and is pressed into tablet form. Since this propellant is a toxic substance, it is being replaced more and more by propellants that do not contain sodium azide. However, these propellants have the disadvantage that they produce combustion gases with very high gas temperatures and a very high cinder content.

A variation on the pyrotechnic gas generator is the hybrid gas generator design. The volume of inflating gas is generated mostly by an inflating gas supplied from a compressed-gas cylinder under high pressure (e.g., argon at about 300 bars) and to a small extent by combustion of a pyrotechnic propellant. The pyrotechnic propellant opens the compressed-gas cylinder, which contains a gas mixture pressurized to as much as 250 bars, and heats the escaping inflating gas to prevent the seals and gas delivery channels from freezing up due to the cooling produced by the expansion. Hybrid gas generators are used in motor vehicles for driver air bags, passenger air bags, and side air bags.

The use of pyrotechnic propellants in both pyrotechnic gas generators and hybrid gas generators imposes exacting requirements on the manufacture and installation of the system components:

The combustion of pyrotechnic propellant charges produces temperatures of up to 2,000° C. The potential danger associated with these high temperatures is tolerated with a good deal of justification (considering the life-saving action of the restraint system).

Another problem associated with pyrotechnic restraint systems is their disposal. This requires careful and completely safe dismantling and neutralization of the propellant charges. Uncontrolled disposal of used vehicles with pyrotechnic propellants or propellant charge components is a significant safety and environmental hazard.

In order to reduce the high temperatures and high cinder content of the combustion gases in pyrotechnic gas generators with azide-free propellants, DE 196 125 81 A1 has already proposed a gas generator in which the combustion chamber contains, in addition to the pyrotechnic propellant, a vaporizable substance placed in front of the discharge ports. Energy exchange between the combustion gas and the vaporizable substance makes it possible to maintain the energy content of the pyrotechnic propellant with only slight losses, so there is adequate energy to deploy and inflate the impact cushion. The energy exchange causes vaporization of the vaporizable substance, which in turn causes cooling of the combustion gas and thus a reduction of the cinder substances. The inflating gas for the impact cushion consists primarily of the combustion gas of the pyrotechnic propellant and the vapor produced as a result of the energy exchange. An advantage of this measure that is specified in the cited document is that the thermal energy of the combustion gas is used to vaporize the vaporizable substance, and the combustion gas is not cooled by parts of the housing.

Although the use of a vaporizable substance as a supplementary measure in the gas generator lowers the temperature of the inflating gas and allows the use of nontoxic pyrotechnic propellants, it does not satisfactorily address other requirements on gas generators. Requirements of particular concern are safe handling of the gas generator, thermal stability, environmentally safe disposal, and inexpensive manufacture.

Therefore, proceeding from this state of the art, the goal of the invention is the development of a gas generator for a passenger restraint system which better satisfies the specified requirements while still using nontoxic starting materials. An additional goal of the invention is the development of a method for generating a volume of inflating gas for an impact cushion of a passenger restraint system.

SUMMARY OF THE INVENTION

The solution to this problem is based on the idea that the required volume of inflating gas be generated exclusively with a propellant that is in the liquid state, when the gas generator is in a state of operational readiness, and that vaporizes instantaneously, when an emergency occurs, i.e., when the restraint system is activated.

In particular, the goal of the invention is achieved with a gas generator of the type mentioned at the beginning which is characterized by the fact that the propellant contains at least one vaporizable liquid substance that is not combustible; the gas generator housing, which is designed as a single pressure chamber having a fixed volume, is heatable; and the pressure chamber contains the vaporizable liquid in an amount $m_0$, which, in the state of operational readiness of the gas generator, has the heat content required to deploy and inflate at least one impact cushion, such that the heat content (enthalpy) of the amount of liquid $m_0$ resulting from the pressure and temperature condition (p, T) in the state of operational readiness is to be determined in such a way that, when the pressure in the pressure chamber is released by the opening of at least one seal, at least enough of the amount of liquid $m_0$ vaporizes to deploy and inflate at least one impact cushion instantaneously with vapor.

During the vaporization, the volume of the liquid vaporizable substance expands by a factor of 800 to 1,000. The heat of vaporization required for the vaporization is provided by ensuring that, in the state of operational readiness of the gas generator, the vaporizable substance has a heat content sufficient to vaporize the amount of liquid needed for the required amount of inflating gas. Depending on the vaporizable substance that is selected for use, this requires a high pressure in the pressure chamber (e.g., 200 bars) and a temperature corresponding to the vapor-pressure curve.

The vaporizable substance may be stored either in the immediate vicinity of each individual impact cushion or in a separate, spatially remote pressure chamber. In one modification of the invention, the vaporizable substance is centrally stored in a single pressure chamber for several or all of the impact cushions in an aircraft, boat, or land vehicle. In this case, when the restraint system is activated, the necessary amount of inflating gas is distributed to the individual impact cushions by lines and by valves and/or distributing devices.

If water is used as the preferred vaporizable substance, the safety requirements that apply in the case of pyrotechnic propellants are unnecessary during the manufacture, processing, storage, disposal, maintenance, repair, and shipment of the gas generators. Another advantage of the gas generator of the invention is that an ignition unit is no longer needed to activate the generation of the inflating gas from the propellant. With the gas generator in accordance with the invention, to release the inflating gas, it is only necessary to release the pressure of the pressure chamber of the operationally ready gas generator. After pressureless filling of the pressure chamber at ambient temperature with the necessary amount $m_0$ of the vaporizable liquid, the operational state is produced by heating the propellant in the sealed pressure chamber by a heating device until the amount $m_0$ of vaporizable substance has the heat content necessary for the vaporization, so that one or more impact cushion can be instantaneously deployed and inflated with vapor.

The complete elimination of pyrotechnic gas generation has the further advantage that the amount of inflating gas to be released can be controlled by systematically controlling the seal, depending on the type of accident and the impact cushion that is to be inflated. The generation of controlled amounts of inflating gas after the ignition of pyrotechnic propellants is a practically insoluble problem.

To place the gas generator in a state of operational readiness and maintain it in this state, the pressure chamber must be equipped with at least one heating device, which is preferably designed as an electrical resistance heater and/or as an electrode boiler. The source of the heating energy can be the electrical system of the vehicle. However, the electric energy for attaining and maintaining the operational state of the restraint system can be effectively obtained from the electrical system only when a well-defined amount of residual energy is available in an energy storage device of the electrical system, especially the starter battery for starting the vehicle.

Alternatively or additionally, the heating energy can be obtained from other heat sources in the vehicle, e.g., from the waste heat of the exhaust gas or from a dedicated heater.

Depending on the type of incombustible, vaporizable liquid used, high temperatures are necessary for the state of operational readiness. In order to reduce the heat flow from the pressure chamber to the outside so as to maintain operational readiness, the pressure chamber is insulated. In addition to the use of highly insulating materials, especially the use of vacuum insulation can be considered. The efficiency of the insulation can be continuously electronically monitored to detect a defect and signal a warning. The activating and monitoring unit is already continuously measuring the temperature of the vaporizable substance to regulate the heating device. If an unexpected temperature drop occurs while the restraint system is in a state of operational readiness, this indicates an insulation defect, and a warning can be signaled.

To maintain the gas generator in a state of operational readiness, a separate compensating heater can be provided to compensate for the heat losses of the vaporizable substance to the environment. Depending on the length of time the vehicle's engine is shut off, the compensating heater can be operated in different ways. When the engine is shut off for only a short period of time, the compensating heater maintains operational readiness, and when it is shut off for a moderately long time, first the battery charge is checked, and if the battery is found to still contain sufficient residual energy, the vaporizable substance is maintained at a reduced temperature. If the engine is shut off for longer periods of time, and the battery charge falls below the necessary residual energy, despite the reduced temperature of the compensating heater, the heater is completely shut off for the remainder of the engine shutdown time in order to preserve sufficient residual energy for the engine to be started later. The temperature prevailing in the pressure chamber after each prolonged shutdown and the heating time that may be required after the engine has been started are preferably indicated by a dashboard display.

The pressure chamber is constructed of a heat-resistant and pressure-resistant material that is impermeable to the vaporizable liquid substance, preferably coated and/or stainless steel, laminates, and carbon fiber-reinforced composites.

The gas generator of the invention is preferably used in restraint systems for vehicles with at least one impact cushion coupled with a gas generator and at least one activating and monitoring unit that controls and/or regulates the gas generator. The task of the activating and monitoring unit is to detect the intensity of vehicle deceleration and, depending on this value, to activate the gas generator within a few milliseconds, as well as to monitor the functions of the restraint system. The vehicle deceleration is electronically measured by sensors. If the deceleration exceeds a certain limit, the activating and monitoring unit opens the seal of the pressure chamber, e.g., by controlling an electromagnetically operated valve or by destroying a diaphragm in the pressure chamber with a punch.

DETAILED DESCRIPTION OF THE PRESENTLY PREFERRED EMBODIMENTS

Figure 1:
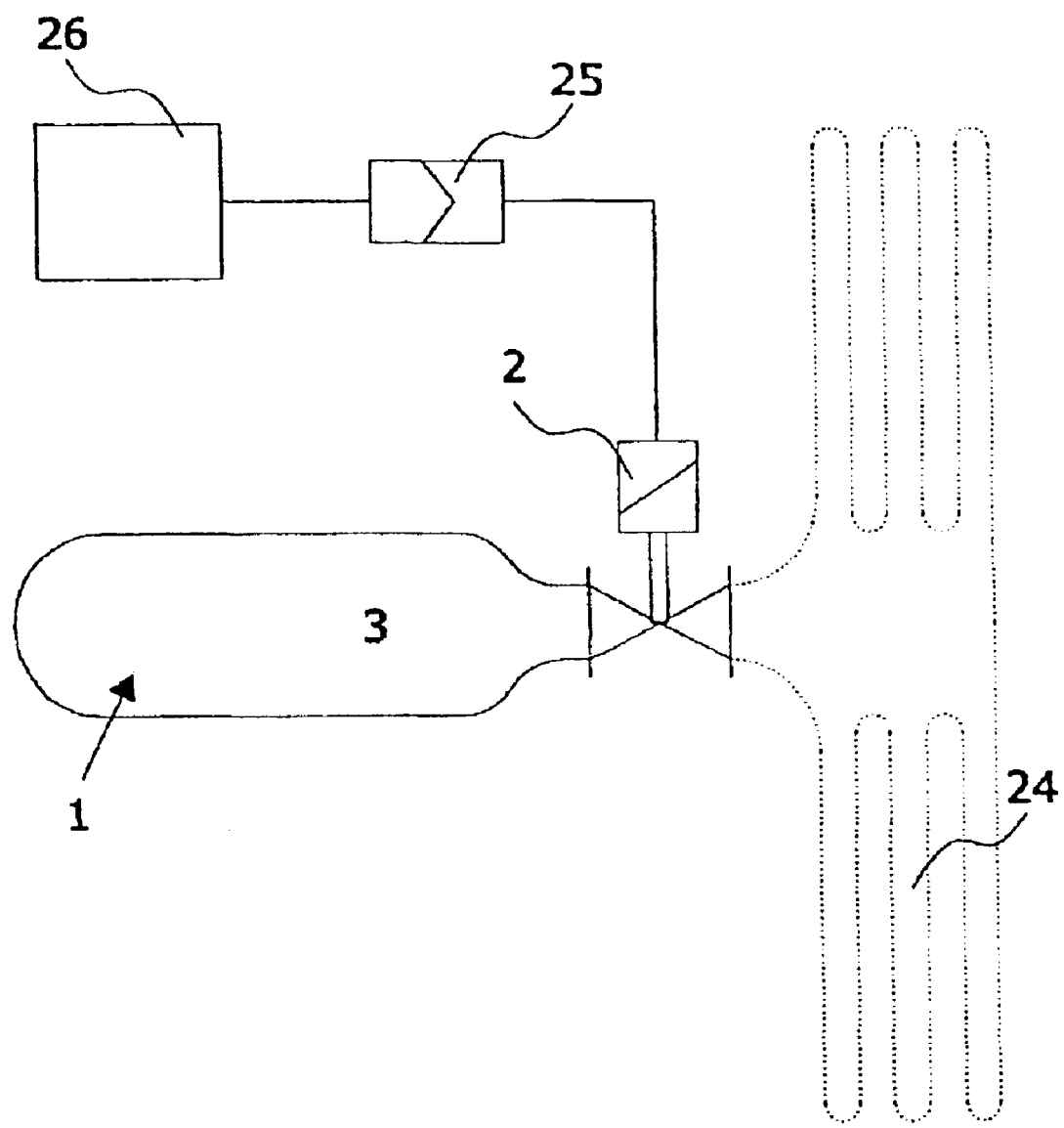
FIG. 1 is a schematic drawing of a restraint system with a gas generator in accordance with the invention.

The passenger restraint system for vehicles shown in FIG. 1 consists of an impact cushion 24 coupled with a gas generator 1 and an activating and monitoring unit 25. The activating and monitoring unit 25 records by a sensor unit 26 when well-defined deceleration values are exceeded, such as the deceleration values that occur in serious accidents. To activate the gas generator 1, the activating and monitoring unit 25 operates a seal 2 designed as a solenoid valve to initiate depressurization of the water heated in the pressure chamber 3. The pressure release causes sudden, technically instantaneous, vaporization of the water. The steam produced by this rapid vaporization deploys and inflates the impact cushion 24.

Figure 2:
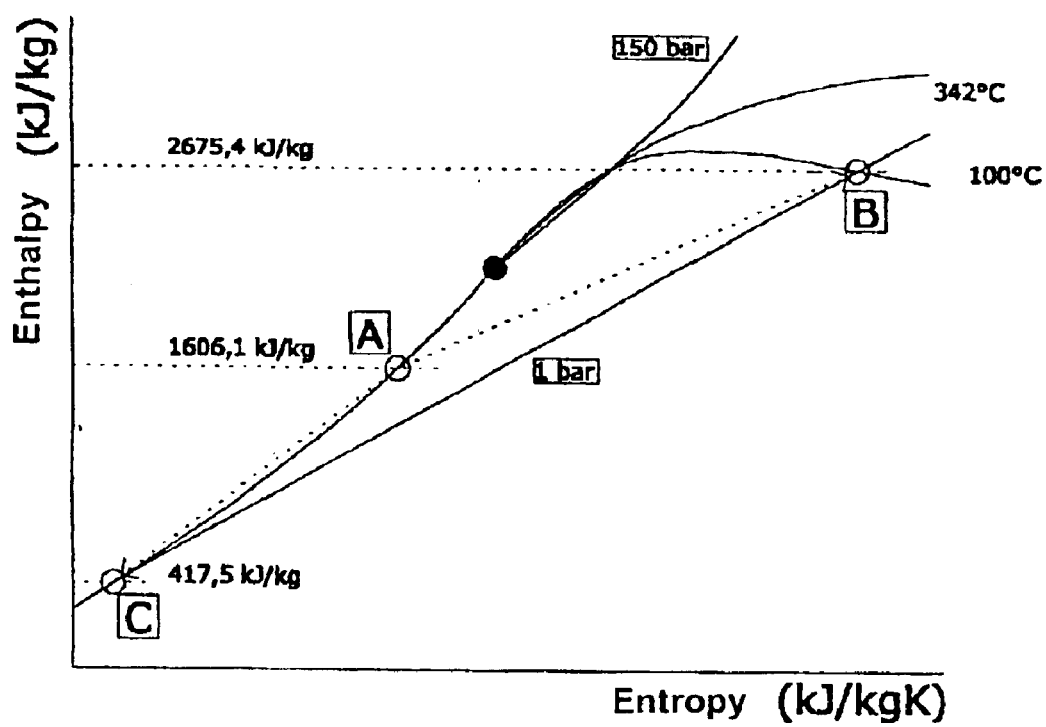
FIGS. 2 and 3 show the operating principle of a gas generator of the invention in graphic form.
Figure 3:
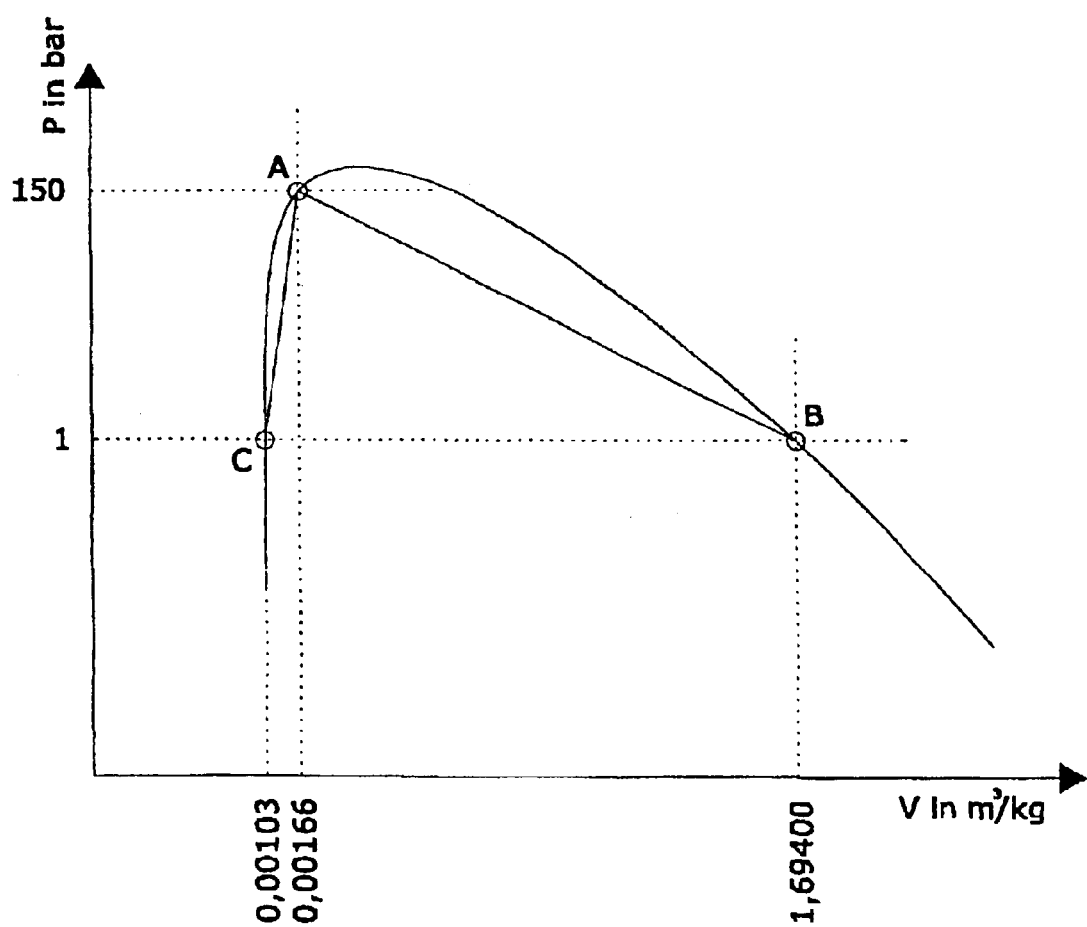

Referring to FIGS. 2 and 3 and using the example of water as a preferred vaporizable substance, we will now explain how the water, which is in the liquid phase when the restraint system is in the state of operational readiness A, technically instantaneously vaporizes when the restraint system is activated by depressurization of the pressure chamber 3. The numerical values given in FIGS. 2 and 3 are thus valid only for water. In the state of operational readiness A, the water is under high pressure and has a high temperature corresponding to this pressure in accordance with the vapor-pressure curve of the vaporizable substance, water (pressure 150 bars; temperature 342° C.; and enthalpy 1,606 kJ/kg). In this state, water has a specific volume of 1.658 liters per kg (see FIG. 3). When the pressure chamber 3 is depressurized, i.e., when the restraint system is activated, the pressure drops to the ambient pressure of about 1 bar, and the quantity of liquid water $m_0$ in the pressure chamber 3 becomes distributed between a vapor state B and a liquid state C. At a pressure of 1 bar, the vapor has an enthalpy of 2,675 kJ/kg, a temperature of 100° C., and a specific volume of 1.694 cubic meters per kg (FIG. 3). Relative to its value in state A, the specific volume has increased by a factor of 1,000. A portion of the water remaining in the chamber is in the liquid state C with the values 1 bar, 100° C., and an enthalpy of 417.5 kJ/kg. The specific volume is 1.03 liters per kg (FIG. 3). The mass proportions into which the water is distributed upon release of the pressure are obtained from the enthalpy balance: The heat content of the water in state A is equal to the sum of the heat contents of the masses of water in states B and C. Energy losses during the transition from state A to states B and C are negligibly small due to the virtually instantaneous change. In the numerical example, this enthalpy balance yields the following ratio for the mass in state B to the mass in state A:

$$0.53:1\{(1,606.1-417.5):(2,675.4-417.5)\}$$

Figure 4:
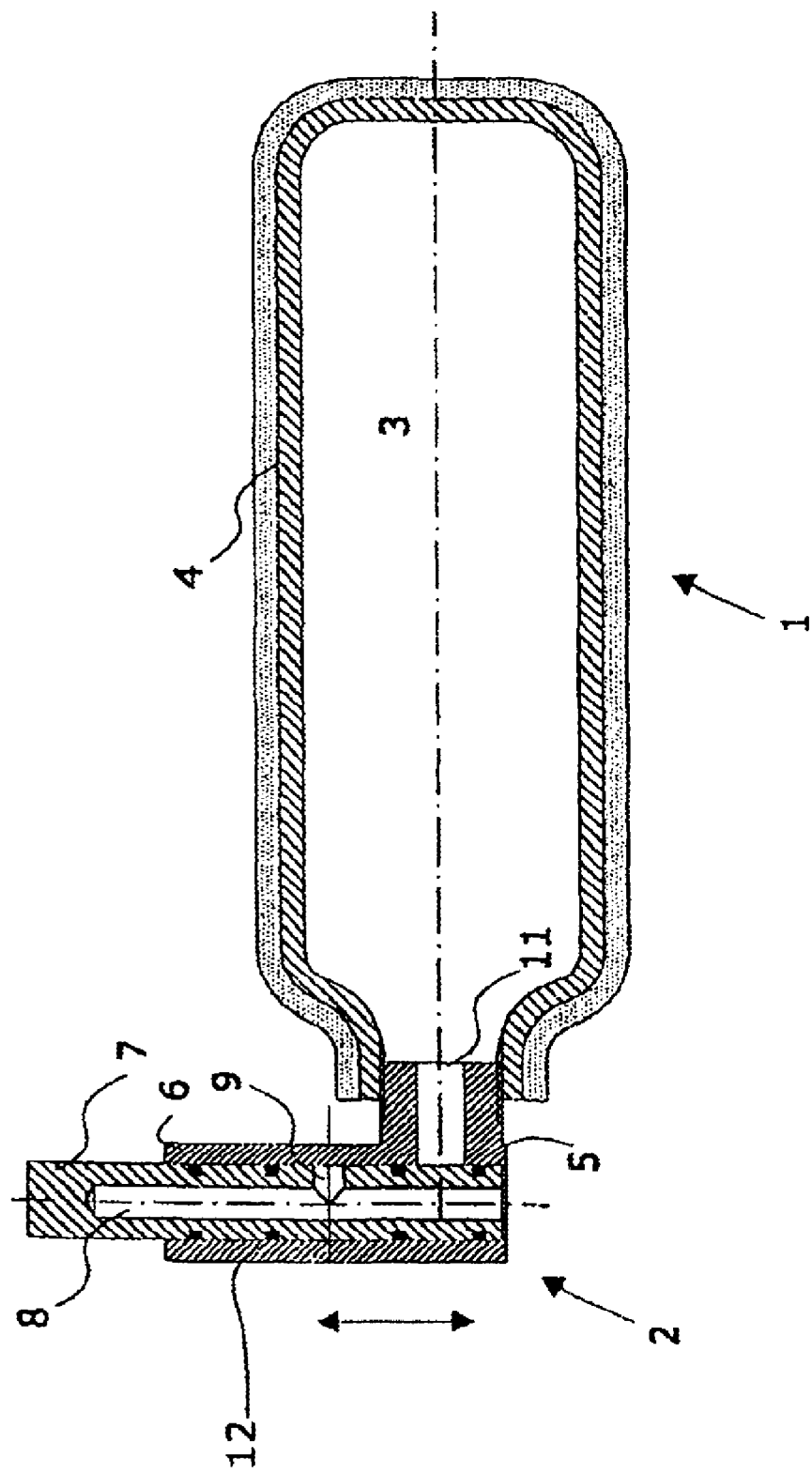
FIG. 4 is a schematic representation of a gas generator of the invention with solid insulation and a valve.
Figure 6:
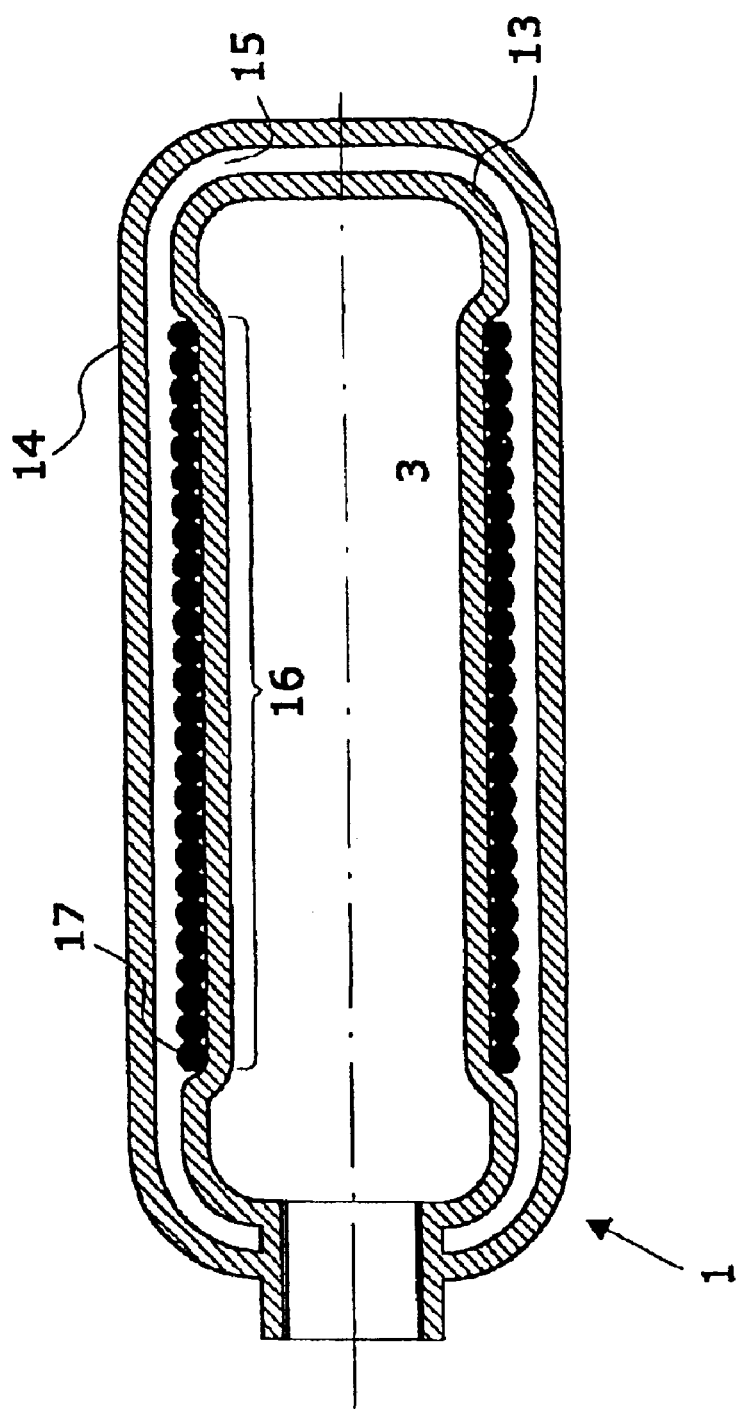
FIG. 6 shows a gas generator of the invention with a heating coil.

FIG. 4 shows an example of a suitable gas generator 1, whose pressure chamber 3 is filled with water as the vaporizable substance. The pressure chamber 3 is surrounded by insulation 4 and can be heated by a heating device, which is shown in FIG. 6. In the operational state of the gas generator, the quantity of water contained in the pressure chamber contains the heat content required to deploy and inflate the impact cushion 24, which is shown in FIG. 1. The operational state of the pressure chamber 3 is attained by heating the water with the heating device until the given quantity of water has the heat content required for the degree of vaporization needed to deploy the impact cushion and inflate it with steam virtually instantaneously, i.e., in about 10–30 milliseconds. The insulation 4 reduces heat loss from the water to the environment and thus the thermal energy that must be supplied to maintain the operational state of the system.

The seal 2 in the embodiment shown in FIG. 4 is designed as a valve. A cylindrical pin 7 with an outlet opening 8 is movably mounted in a guide block 6 with a cylindrical passage. A transverse channel 9, which can be aligned with an outlet 11 of the pressure chamber 3 by moving the pin, opens approximately into the middle section of the outlet opening 8. Several O-rings 12 produce a gastight seal between the cylindrical pin 7 and the guide block 6. The pin 7 can be moved in the direction of the double arrow, for example, by an electromagnet (not shown in FIG. 4), which is controlled by the activating and monitoring unit 25. The end face of the seal 2 has a connector 5, to which an impact cushion 24 (not shown) is connected either directly or by a supply line, which in this case supplies steam to a spatially remote impact cushion.

Figure 5:
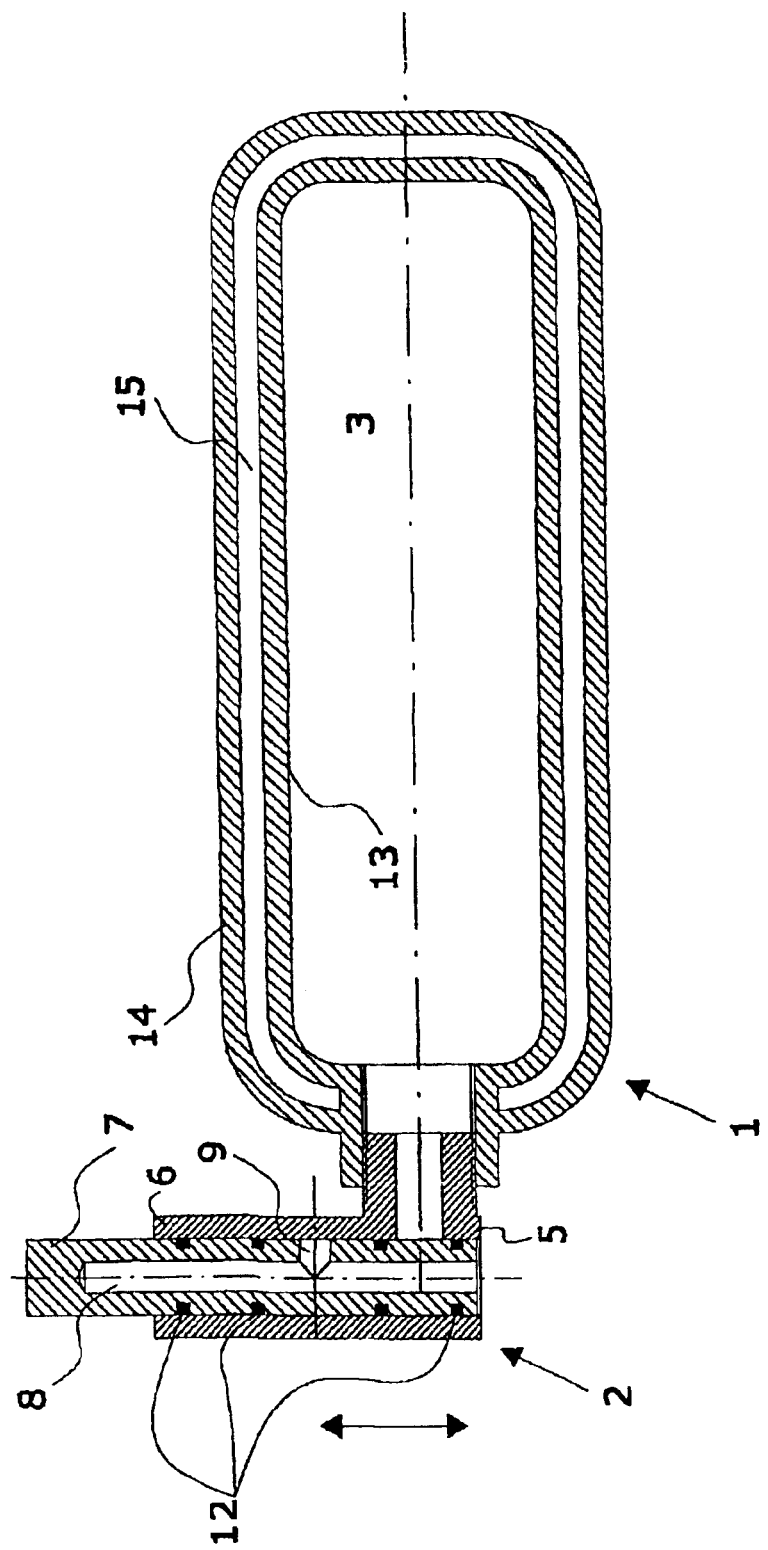
FIG. 5 shows a gas generator of the invention with vacuum insulation and a valve.

The gas generator 1 in FIG. 5 has the same seal as the gas generator in FIG. 4, so the explanation provided in connection with FIG. 4 applies here as well. However, the pressure chamber 3 has a double-walled construction. Between the walls 13, 14, there is an evacuated annular space 15 that surrounds the pressure chamber 3 as an insulator.

FIG. 6 also shows a gas generator 1 with an insulating annular space 15. The wall 13 has a narrowed region 16 surrounded by a heating coil 17. The heating coil 17 is supplied with electric power from the electrical system of a vehicle by electrical lines (not shown in FIG. 6). The seal 2 for releasing the pressure from the pressure chamber 3 and the power supply lines for the heating coil 17 are not shown in FIG. 6.

Figure 7B:
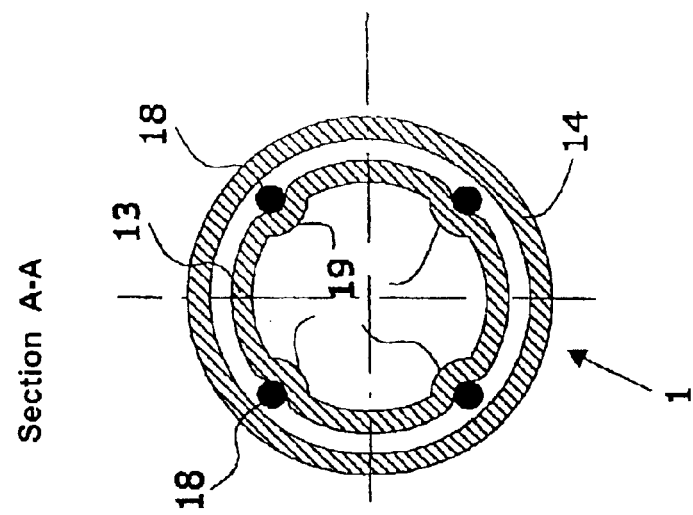
FIGS. 7a and 7b show a gas generator of the invention with heating rods.
Figure 7A:
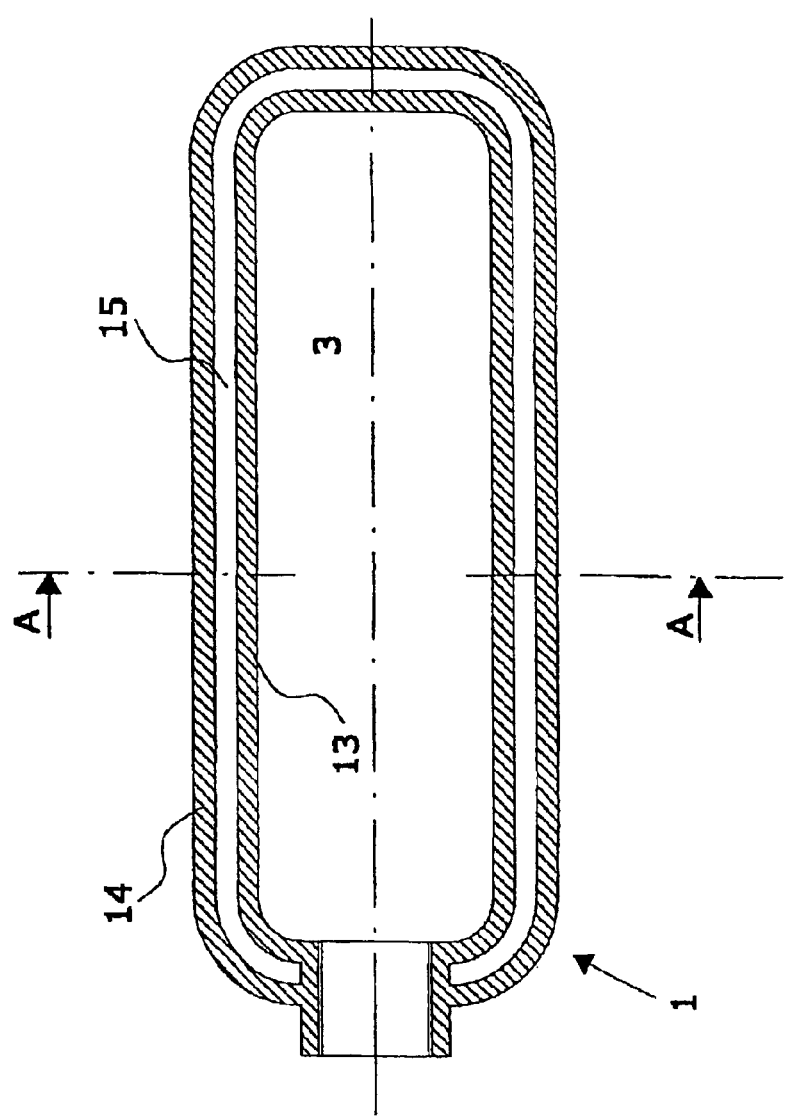

FIGS. 7a and 7b show a gas generator 1 with heating rods 18 that extend in the axial direction of the pressure chamber 3. The heating rods 18 are installed in the insulating annular space 15 in axial hollows 19 in the wall 13. The seal 2 and the electrical lines that supply power to the heating rods 18 are not shown in FIGS. 7a and 7b.

Figure 8:
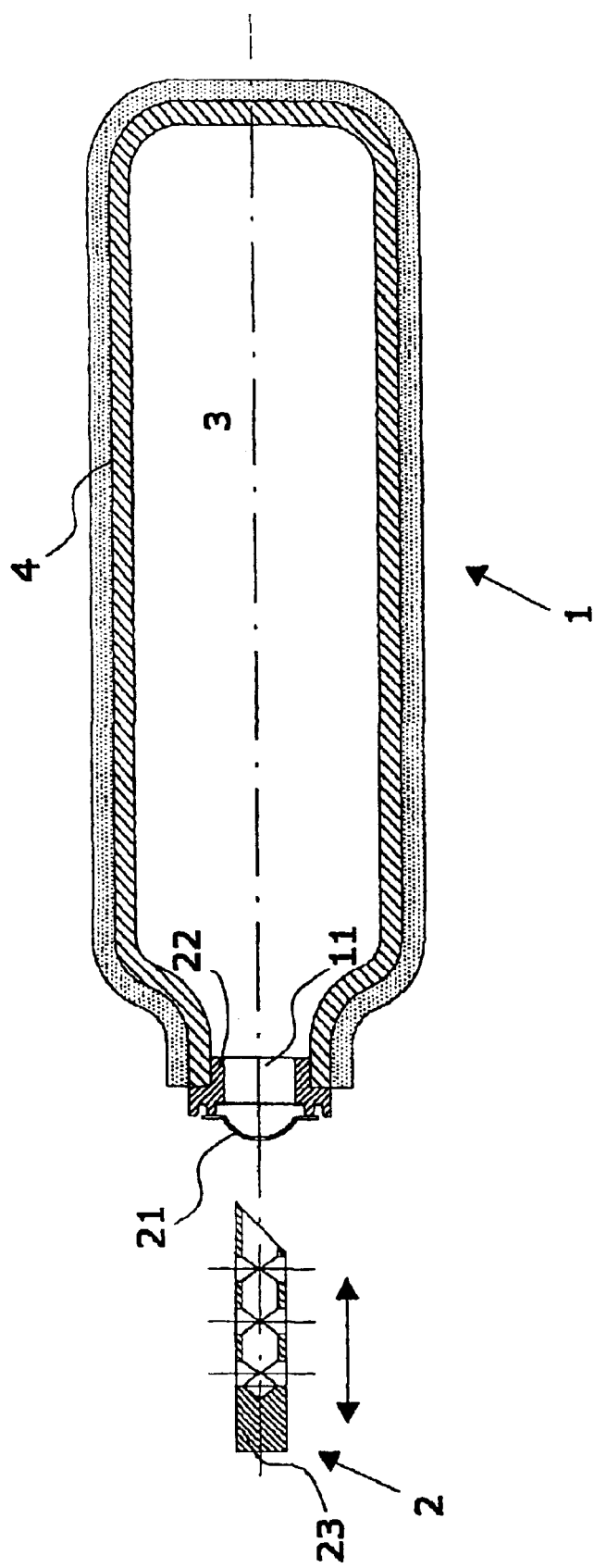
FIG. 8 shows a gas generator of the invention with solid insulation and a diaphragm.

Finally, FIG. 8 shows a gas generator with a pressure chamber 3 with the same construction as in FIG. 4, except that it has a different type of seal 2. The seal 2 consists of a diaphragm 21, which is securely attached along its outer edge with an insert 22, which in turn is screwed into the outlet 11 of the pressure chamber 3. A punch 23 can be moved in the axial direction of the pressure chamber 3 by means not shown in FIG. 8, such as an electromagnet or a pyrotechnic charge. When the passenger restraint system is activated, the punch 23 punches through and destroys the diaphragm 21. This results in depressurization of the water in the pressure chamber 3 and deployment and inflation of the impact cushion 24, which is not shown in the drawing.

What is claimed is:

1. A gas generator for deploying and inflating at least one impact cushion of a passenger restraint system, said generator comprising:

a single pressure chamber with a fixed volume having at least one seal and holding a propellant consisting of an amount of water which is sufficient to deploy and inflate at least one impact cushion exclusively with water vapor when said water is maintained under conditions of pressure and temperature which are sufficient to cause enough of said water to vaporize and inflate said at least one impact cushion substantially instantaneously when said at least one seal is opened, said pressure chamber being heatable.

2. A gas generator as in claim 1 further comprising means for heating said chamber so that said conditions of pressure and temperature are maintained.

3. A gas generator as in claim 2 wherein said means for heating comprises at least one of a resistance heater and an electrode boiler.

4. A gas generator as in claim 1 wherein each said at least one seal comprises one of a valve and a diaphragm.

5. A gas generator as in claim 1 wherein said pressure chamber is constructed of a heat resistant and pressure resistant material which is impermeable to water.

6. A gas generator as in claim 1 wherein said pressure chamber comprises vacuum insulation.

7. A gas generator as in claim 1 wherein said seal comprises a solenoid valve.

8. A passenger restraint system for a vehicle, said passenger restraint system comprising:

at least one impact cushion;

a single pressure chamber with a fixed volume having at least one seal and holding a propellant for generating a quantity of inflating gas, said propellant consisting of an amount of water which is sufficient to deploy and inflate said at least one impact cushion exclusively with water vapor when said water is maintained under conditions of pressure and temperature which are sufficient to cause enough of said water to vaporize and inflate said at least one impact cushion substantially instantaneously when said at least one seal is opened, said pressure chamber being heatable; and an activating and monitoring unit which opens said at least one seal when said vehicle exceeds well-defined deceleration values.

9. A passenger restraint system as in claim 8 further comprising means for heating said chamber so that said conditions of pressure and temperature are maintained.

10. A passenger restraint system as in claim 8 wherein said seal comprises a solenoid valve.

11. A method for deploying and inflating at least one impact cushion of a passenger restraint system in a vehicle, said method comprising:

maintaining an amount of water under conditions of pressure and temperature which are sufficient to cause enough of said water to vaporize and inflate said at least one impact cushion exclusively with water vapor substantially instantaneously when said pressure is released; and releasing the pressure in said water when said vehicle exceeds well-defined deceleration values.

12. A method as in claim 11 comprising holding said amount of water in a pressure chamber with at least one seal and raising the temperature and pressure of the water until the heat content of the water is sufficient to cause enough of said water to vaporize and inflate said at least one impact cusion substantially instantaneously when said at least one seal is opened.

13. A method as in claim 11 wherein said water is heated by thermal energy obtained from at least one of an electrical system and another heat source of the vehicle.

14. A method as in claim 13 wherein said thermal energy is obtained from the engine of the vehicle as waste heat.

15. A method as in claim 13 wherein said thermal energy is obtained from said electrical system only when a well-defined level of energy is available from an energy storage device of the electrical system.

16. A method as in claim 11 wherein said water is vaporized at a central location and connected to a plurality of impact cushions by a distribution system.

17. A method as in claim 11 wherein said pressure is released by opening a solenoid valve.

* * * * *

UNITED STATES PATENT AND TRADEMARK OFFICE
CERTIFICATE OF CORRECTION

PATENT NO.         : 6,932,383 B2
APPLICATION NO. : 10/344497
DATED              : August 23, 2005
INVENTOR(S)      : Frieder Flamm It is certified that error appears in the above-identified patent and that said Letters Patent is hereby corrected as shown below:

<u>Title page,</u>
Item [30], References Cited, FOREIGN PATENT DOCUMENTS, insert the following:
-- 100 40 000.0   11   August 2000       (11.08.2000)   DE
   100 56 228.9   13   November 2000   (13.11.2000)   DE --

Signed and Sealed this

Fourth Day of July, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,932,383 B2 | Page 1 of 1 |
| APPLICATION NO. | : 10/344497 | |
| DATED | : August 23, 2005 | |
| INVENTOR(S) | : Frieder Flamm | |

It is certified that error appears in the above-identified patent and that said Letters Patent is hereby corrected as shown below:

Please insert on the Title Page Item -30- of the Letters Patent the following foreign priority data:

--100 40 000.0   11  August 2000        (11.08.2000)    DE 100 56 228.9   13  November 2000    (13.11.2000)    DE--

Signed and Sealed this

Twenty Second Day of April, 2008

JON W. DUDAS
*Director of the United States Patent and Trademark Office*